US012776180B2

(12) United States Patent
Sakamoto

(10) Patent No.: US 12,776,180 B2
(45) Date of Patent: Oct. 27, 2026

(54) PROCESSING OF MEDIA

(71) Applicant: GLORY LTD., Himeji (JP)

(72) Inventor: Masao Sakamoto, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 19/079,671

(22) Filed: Mar. 14, 2025

(65) Prior Publication Data

US 2026/0279130 A1 Sep. 17, 2026

(51) Int. Cl.

*G07D 11/245* (2019.01)
*G07D 11/125* (2019.01)
*G07D 11/13* (2019.01)
*G07D 11/18* (2019.01)
*G07D 11/25* (2019.01)

(52) U.S. Cl.

CPC ......... *G07D 11/245* (2019.01); *G07D 11/125* (2019.01); *G07D 11/13* (2019.01); *G07D 11/18* (2019.01); *G07D 11/25* (2019.01); *B65H 2301/448* (2013.01); *B65H 2701/1912* (2013.01); *G07D 2207/00* (2013.01); *G07D 2211/00* (2013.01)

(58) Field of Classification Search

CPC .... G07D 11/245; G07D 11/125; G07D 11/13; G07D 11/18; G07D 11/25

See application file for complete search history.

(56) References Cited

U.S. PATENT DOCUMENTS 8,857,597 B2 * 10/2014 Sakamoto ............ G07D 11/125 194/200
11,636,739 B2 * 4/2023 Jang ....................... G07D 11/25 235/379
11,699,332 B2 * 7/2023 Fraser .................. G07F 19/205 235/379
12,169,994 B2 * 12/2024 Nakayama ............. G07D 11/18
12,230,091 B2 * 2/2025 Park ....................... B65H 43/04
2015/0243119 A1 8/2015 Hayashi et al.
2023/0298424 A1 * 9/2023 Shin ....................... G07D 11/18

FOREIGN PATENT DOCUMENTS

JP 5462134 B2 4/2014
JP 6088453 B2 3/2017

* cited by examiner

*Primary Examiner* — Jeremy R Severson
(74) *Attorney, Agent, or Firm* — XSENSUS LLP

(57) ABSTRACT

A device for processing media, includes: a safe; an internal storage installed within the safe; a conveyor configured to convey media between the internal storage and an external storage, the external storage being configured to be fixed to the device outside the safe; a temporary storage coupled to the conveyor; and a recognition sensor configured to recognize media conveyed by the conveyor. The conveyor is configured to: perform first conveyance to convey media from the internal storage to the temporary storage; perform second conveyance to convey media from the external storage to the internal storage, after the first conveyance; and perform third conveyance to convey media from the temporary storage to the external storage, after the second conveyance. The external storage is configured to be maintained in a fixed state to the device during the first conveyance to the third conveyance.

19 Claims, 8 Drawing Sheets

PROCESSING OF MEDIA

BACKGROUND

The present disclosure relates to processing of media.

A media processing device may use an external storage to perform either a media collection process or a media replenishment process.

SUMMARY

According to an embodiment of the present disclosure, there is provided a device for processing media. The device includes: a safe; an internal storage installed within the safe; a conveyor configured to convey media between the internal storage and an external storage, the external storage being configured to be fixed to the device outside the safe; a temporary storage coupled to the conveyor; and a recognition sensor configured to recognize media conveyed by the conveyor. The conveyor is configured to: perform first conveyance to convey media from the internal storage to the temporary storage; perform second conveyance to convey media from the external storage to the internal storage, after the first conveyance; and perform third conveyance to convey media from the temporary storage to the external storage, after the second conveyance. The external storage is configured to be maintained in a fixed state to the device during the first conveyance to the third conveyance.

According to another embodiment of the present disclosure, there is provided a method in a device for processing media. The device includes: a safe; an internal storage installed within the safe; a conveyor configured to convey media between the internal storage and an external storage, the external storage being configured to be fixed to the device outside the safe; a temporary storage coupled to the conveyor; and a recognition sensor configured to recognize media conveyed by the conveyor. The method includes: performing, by the conveyer, first conveyance to convey media from the internal storage to the temporary storage; performing, by the conveyer, second conveyance to convey media from the external storage to the internal storage, after the first conveyance; performing, by the conveyer, third conveyance to convey media from the temporary storage to the external storage, after the second conveyance; and maintaining the external storage in a fixed state to the device during the first conveyance to the third conveyance.

DETAILED DESCRIPTION

Hereinafter, exemplary embodiments of the present disclosure will be described in detail with reference to the attached drawings.

It is to be noted that the present disclosure is not limited to these exemplary embodiments to be given below and may be implemented with various modifications within the scope of the present disclosure. In addition, the drawings used herein are for purposes of illustration, and may not show actual dimensions.

The present disclosure is directed to processing of media. Hereinafter, banknotes will be used as an example of media. The term "banknote" as used herein denotes paper currency issued by a government or a bank. Paper currency may also be referred to as a "bank bill" or simply a "bill," but will be referred to as a "banknote" in the following. Media may also be checks or coins. Thus, the present disclosure is applicable, for example, to cases where a mixture of banknotes and checks is processed, or where a mixture of banknotes and coins is processed.

First Exemplary Embodiment

Figure 1:
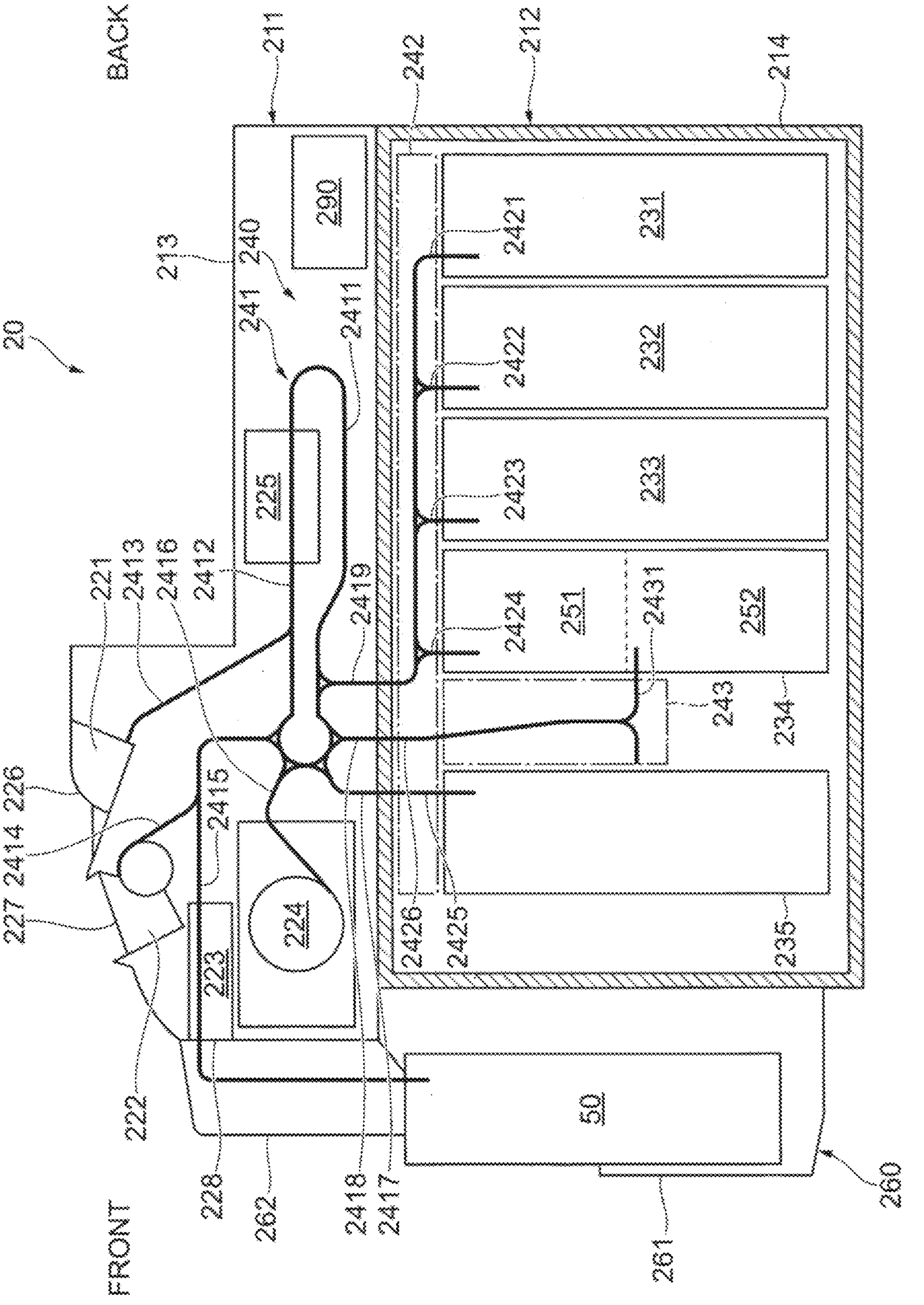
FIG. 1 shows a side view of an example configuration of a banknote processing device in a first exemplary embodiment.

FIG. 1 shows a side view of a banknote processing device 20 in a first exemplary embodiment. The banknote processing device 20 may be configured to be capable of using an external cassette 50. The banknote processing device 20 may include a mounting unit 260. The external cassette 50 may be removably attached to the mounting unit 260. The mounting unit 260 may mechanically be locked to prevent attachment thereto of the external cassette 50 in cases where the external cassette 50 need not be used.

As shown in FIG. 1, the banknote processing device 20 may include a processing part 211 at the top and a safe box part 212 at the bottom.

The processing part 211 may be composed of an upper housing 213. The upper housing 213 may include an inlet unit 221, an outlet unit 222, a first front conveyance unit 223, a temporary storage unit 224, a recognition sensor 225, and an upper conveyance unit 241. The upper conveyance unit 241 may be part of a conveyance unit 240.

The inlet unit 221 may be used to insert banknotes to be deposited, for example, during a deposit process. The inlet unit 221 may include an inlet opening 226. An operator can manually insert banknotes into the inlet unit 221 through the inlet opening 226. The inlet unit 221 can hold multiple banknotes in a stacked state. The inlet unit 221 may have a mechanism to take banknotes into the banknote processing device 20 one by one.

The outlet unit 222 may be given banknotes that have been fed out from any of storage units, for example, during a withdrawal process. The outlet unit 222 may also be given banknotes that are not determined to be normal banknotes, for example, during a replenishment or collection process. The outlet unit 222 can hold multiple banknotes in a stacked state. The outlet unit 222 may include an outlet opening 227. An operator can manually remove banknotes accumulated in the outlet unit 222 through the outlet opening 227. The outlet unit 222 may be configured to take the banknotes at the outlet unit 222 inside the banknote processing device 20. For example, the outlet unit 222 may have a mechanism to take banknotes into the banknote processing device 20 one by one. The outlet opening 227 may be provided with a shutter (not shown) that opens and closes the outlet opening 227. The outlet unit 222 is an example of the claimed outlet.

The first front conveyance unit 223 may convey banknotes. The first front conveyance unit 223 may be located at the front within the upper housing 213. The first front conveyance unit 223 may be connected to the mounting unit 260. The processing part 211 may have a connecting opening 228. The connecting opening 228 may open forward at the front of the upper housing 213. The first front conveyance unit 223 may have a shutter (not shown). The shutter may open and close the connecting opening 228. When the shutter opens, the mounting unit 260 may engage the first front conveyance unit 223 via the connecting opening 228. The first front conveyance unit 223 and the mounting unit 260 may be connected to each other.

As shown by the thick solid line in FIG. 1, the first front conveyance unit 223 may have a conveyance path. The conveyance path may connect the mounting unit 260 with a fifth upper conveyance path 2415 described below. As described below, banknotes conveyed from the mounting unit 260 may be conveyed along the conveyance path of the first front conveyance unit 223 toward the fifth upper conveyance path 2415. Also, banknotes conveyed from the fifth upper conveyance path 2415 may be conveyed along the conveyance path of the first front conveyance unit 223 toward the mounting unit 260.

The temporary storage unit 224 may temporarily store banknotes to be deposited, for example, during the deposit process. The temporary storage unit 224 may also temporarily store banknotes to be collected, for example, during the collection process. The temporary storage unit 224 may also temporarily store banknotes that are not determined to be normal banknotes, for example during the replenishment process. The temporary storage unit 224 can feed out banknotes that have been stored therein. The temporary storage unit 224 may be located in front of the recognition sensor 225 in the upper housing 213. The temporary storage unit 224 may be a tape-type storage unit. The temporary storage unit 224 may store banknotes by wrapping them around the drum with the tape. The tape-type storage unit has the advantage that the order of banknotes does not change when storing and unloading the banknotes. The tape-based storage unit also has the advantage that it can store a mixture of banknotes of various sizes. The temporary storage unit 224 can employ a well-known configuration of a tape-type storage unit. The temporary storage unit 224 is an example of the claimed temporary storage.

The recognition sensor 225 may be provided on the upper conveyance unit 241. The recognition sensor 225 may recognize at least the authenticity, denomination, and soundness of each banknote conveyed along the upper conveyance unit 241. The recognition sensor 225 may also read a symbolic code number printed on each banknote. The recognition sensor 225 is an example of the claimed recognition sensor.

The safe box part 212 may be composed of a safe box housing 214. The safe box housing 214 may include multiple storage units 231 to 235 and lower conveyance units 242 and 243. The lower conveyance units 242 and 243 may be part of the conveyance unit 240. The safe box housing 214 may protect the multiple storage units 231 to 235 with a predetermined level of security. Specifically, the safe box housing 214 may be formed by a metal plate of a predetermined thickness or greater. The security level of the safe box housing 214 may be higher than that of the upper housing 213. The safe box part 212 is an example of the claimed safe.

The first to third storage units 231 to 233 and the fifth storage unit 235 may have the same configuration. The first to third storage units 231 to 233 and the fifth storage unit 235 may each be a stack-type storage unit, although detailed illustrations are omitted. The stack-type storage unit stores banknotes by stacking them on top of each other. The first to third storage units 231 to 233 and the fifth storage unit 235 may each contain one storage space. The first to third storage units 231 to 233 and the fifth storage unit 235 may also each have a conveyance mechanism. The conveyance mechanism may store banknotes from outside to inside the storage unit and may feed out banknotes from inside to outside the storage unit.

The fourth storage unit 234 may include the first storage space 251 and the second storage space 252. The first storage space 251 may be provided on the top side. The second storage space 252 may be provided below the first storage space 251. The first storage space 251 and the second storage space 252 may be independent of each other. The fourth storage unit 234 may have the first conveyance mechanism for the first storage space 251 and the second conveyance mechanism for the second storage space 252. The fourth storage unit 234 can store banknotes in the first storage space 251 and feed out the banknotes from the first storage space 251, and can store banknotes in the second storage space 252 and feed out the banknotes from the second storage space 252. Alternatively, the fifth storage unit 235 may include a first storage space and a second storage space like the fourth storage unit 234.

The first to fourth storage unit 231 to 234 may each store banknotes of different denominations. The first to fourth storage unit 231 to 234 may each store banknotes for withdrawal. The fifth storage unit 235 may store banknotes that are not to be stored in any of the first to fourth storage units 231 to 234. The fifth storage unit 235 may not store banknotes for withdrawal. The fifth storage unit 235 may store banknotes that are not determined to be normal banknotes, for example, during the replenishment or collection process. An arbitrarily selected storage unit from the first to fifth storage units 231 to 235 may store banknotes that are not determined to be normal banknotes during the replenishment or collection process. However, in the following description, it is assumed that the fifth storage unit 235 stores banknotes that are not determined to be normal banknotes during the replenishment or collection process. Each of the first to fourth storage units 231 to 234 is an example of the claimed internal storage. The fifth storage unit 235 is an example of the claimed specific storage.

The conveyance unit 240 may convey banknotes one by one within the banknote processing device 20, with spaces between each banknote. The conveyance unit 240 may include conveyance paths. The conveyance paths may be composed of a combination of multiple rollers, multiple belts, a motor driving these, and multiple guides, which are not shown. The conveyance unit 240 may convey the banknote, for example, with its long edge leading. The conveyance unit 240 may convey the banknote, for example, with its short edge leading.

The conveyance unit 240 may include the upper conveyance unit 241 and the lower conveyance units 242 and 243. The upper conveyance unit 241 may be provided in the upper housing 213, as described above. The lower conveyance units 242 and 243 may be provided in the safe box housing 214, as described above. Three conveyance paths may be formed in the vertical direction through the upper wall defining the safe box housing 214. The three conveyance paths may connect the upper conveyance unit 241 to the lower conveyance units 242 and 243.

The upper conveyance unit 241 may include first to ninth upper conveyance paths 2411 to 2419. The lower conveyance unit 242 may include first to sixth lower conveyance paths 2421 to 2426. The lower conveyance unit 243 may include a seventh lower conveyance path 2431. The conveyance unit 240 is an example of the claimed conveyor.

The external cassette 50 may be connected to the banknote processing device 20 via the mounting unit 260, as described above. The mounting unit 260 may include a mounter 261 and a second front conveyance unit 262, although shown diagrammatically in FIG. 1.

The external cassette 50 may be a stack-type storage cassette, although not shown in detail. The external cassette 50 may have a conveyance mechanism. The conveyance mechanism may introduce banknotes from the outside into the inside of the external cassette 50 and store the banknotes inside the external cassette 50. The conveyance mechanism may also eject banknotes stored in the external cassette 50 from the inside to the outside of the external cassette 50. Alternatively, the external cassette 50 may be a tape-type storage cassette.

The external cassette 50 may have substantially the same structure as the first to third storage units 231 to 233 and the fifth storage unit 235. The external cassette 50 may also have the same external dimensions as the first to fifth storage units 231 to 235. The external cassette 50 may be removably attached to the safe box housing 214 in the same position in which the first to fifth storage units 231 to 235 are placed. The external cassette 50 may be repurposed as the first to third storage units 231 to 233 and the fifth storage unit 235.

The external cassette 50 may be mounted on the mounter 261. The mounter 261 may hold the external cassette 50. The external cassette 50 is an example of the claimed external storage.

The second front conveyance unit 262 may be connected to the connecting opening 228 of the first front conveyance unit 223. The second front conveyance unit 262 may have a conveyance path, as shown by the thick solid line in FIG. 1. This conveyance path may connect the conveyance path of the first front conveyance unit 223 with the external cassette 50. The second front conveyance unit 262 may convey banknotes fed out from the external cassette 50 to the first front conveyance unit 223. The second front conveyance unit 262 may also convey banknotes sent from the first front conveyance unit 223 to the external cassette 50.

As also shown in FIG. 1, the banknote processing device 20 may include a control unit 290. The control unit 290 may be a central processing unit (CPU), and may be connected to a random access memory (RAM), a read only memory (ROM), a hard disk drive (HDD), and the like, which are not shown. The control unit 290 may control the entire banknote processing device 20, for example, by reading a program stored in the ROM into the RAM and executing it.

First, the control unit 290 may control the conveyance unit 240 to perform first conveyance. Here, the first conveyance may be the first half of the collection process. Specifically, the first conveyance may be the process of conveying banknotes from any of the first to fourth storage units 231 to 234 to the temporary storage unit 224.

At that time, the control unit 290 may control the recognition sensor 225 to recognize each of the banknotes conveyed by the conveyance unit 240. Alternatively, the control unit 290 may control the recognition sensor 225 not to recognize each of the banknotes conveyed by the conveyance unit 240. Whether the control unit 290 controls the recognition sensor 225 to recognize or not to recognize each of the banknotes may be determined by a setting of the recognition sensor 225. If the recognition sensor 225 recognizes normal media, the control unit 290 may control the conveyance unit 240 to convey the normal media to the temporary storage unit 224. If the recognition sensor 225 recognizes abnormal media, the control unit 290 may control the conveyance unit 240 to convey the abnormal media to a first reject unit. The first reject unit is an example of the claimed first evacuation storage.

Next, the control unit 290 may control the conveyance unit 240 to perform second conveyance. Here, the second conveyance may be a replenishment process. Specifically, the second conveyance may be the process of conveying banknotes from the external cassette 50 to any of the first to fourth storage units 231 to 234.

At that time, the control unit 290 may control the recognition sensor 225 to recognize each of the banknotes conveyed by the conveyance unit 240. If the recognition sensor 225 recognizes normal media, the control unit 290 may control the conveyance unit 240 to convey the normal media to any of the first to fourth storage units 231 to 234. If the recognition sensor 225 recognizes abnormal media, the control unit 290 may control the conveyance unit 240 to convey the abnormal media to a second reject unit. The second reject unit is an example of the claimed second evacuation storage.

Next, the control unit 290 may control the conveyance unit 240 to perform third conveyance. Here, the third conveyance may be the latter half of the collection process. Specifically, the third conveyance may be the process of conveying the normal banknotes from the temporary storage unit 224 to the external cassette 50.

The control unit 290 may also control the external cassette 50 to remain fixed to the banknote processing device 20 during the first conveyance to the third conveyance.

In addition, the control unit 290 may control information about the first conveyance, the second conveyance, and the third conveyance to be stored in a memory of the external cassette 50. The information about the first conveyance, the second conveyance, and the third conveyance may be information about the collection process and the replenishment process. The information about the collection process and the replenishment process may include the type of process, date and time, the serial number of the banknote processing device 20, the denomination, the symbolic code number, the reasons why abnormal banknotes were determined to be abnormal, and the like. Alternatively, the information about the collection process and the replenishment process may further include an image of a banknote. The control unit 290 is an example of the claimed control circuitry.

Figure 2:
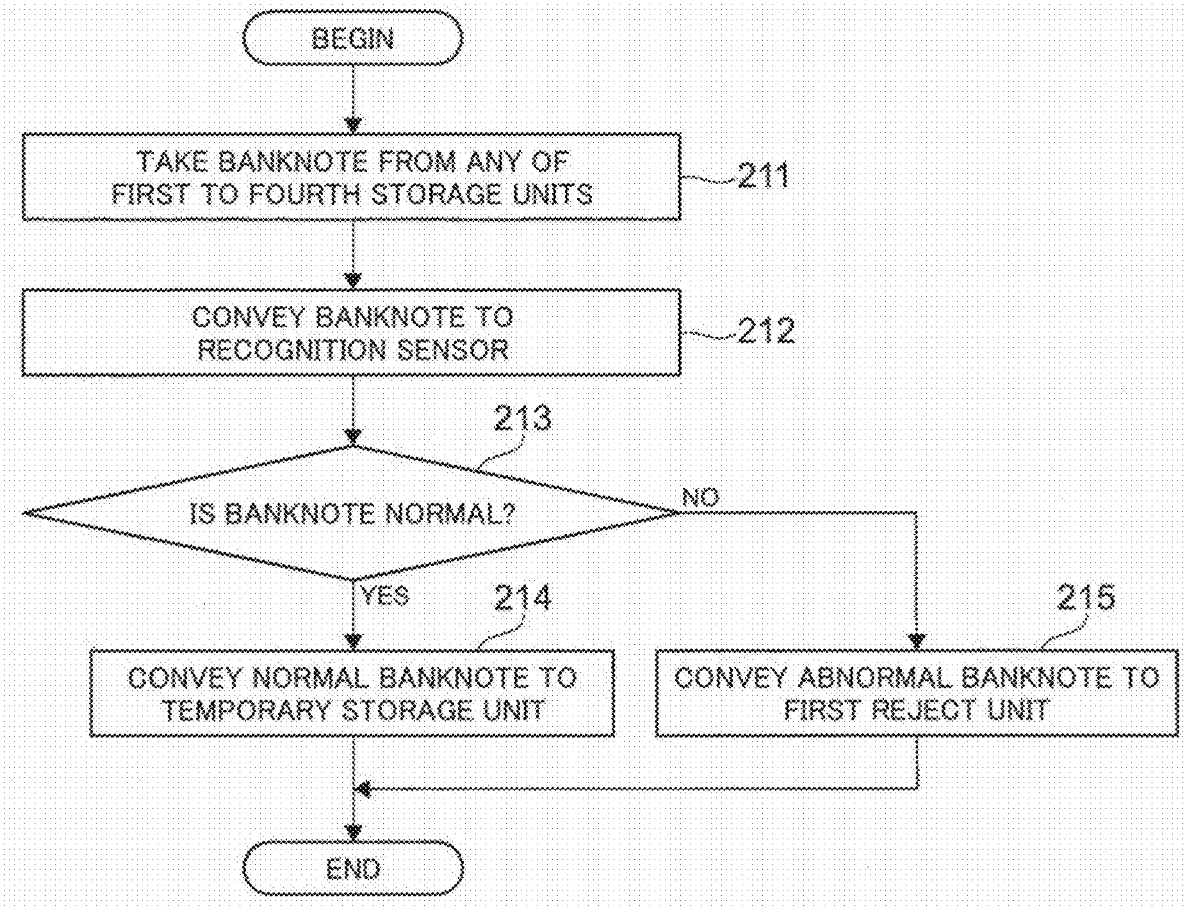
FIG. 2 is a flowchart showing an example of the operation of the banknote processing device performing first conveyance.
Figure 3:
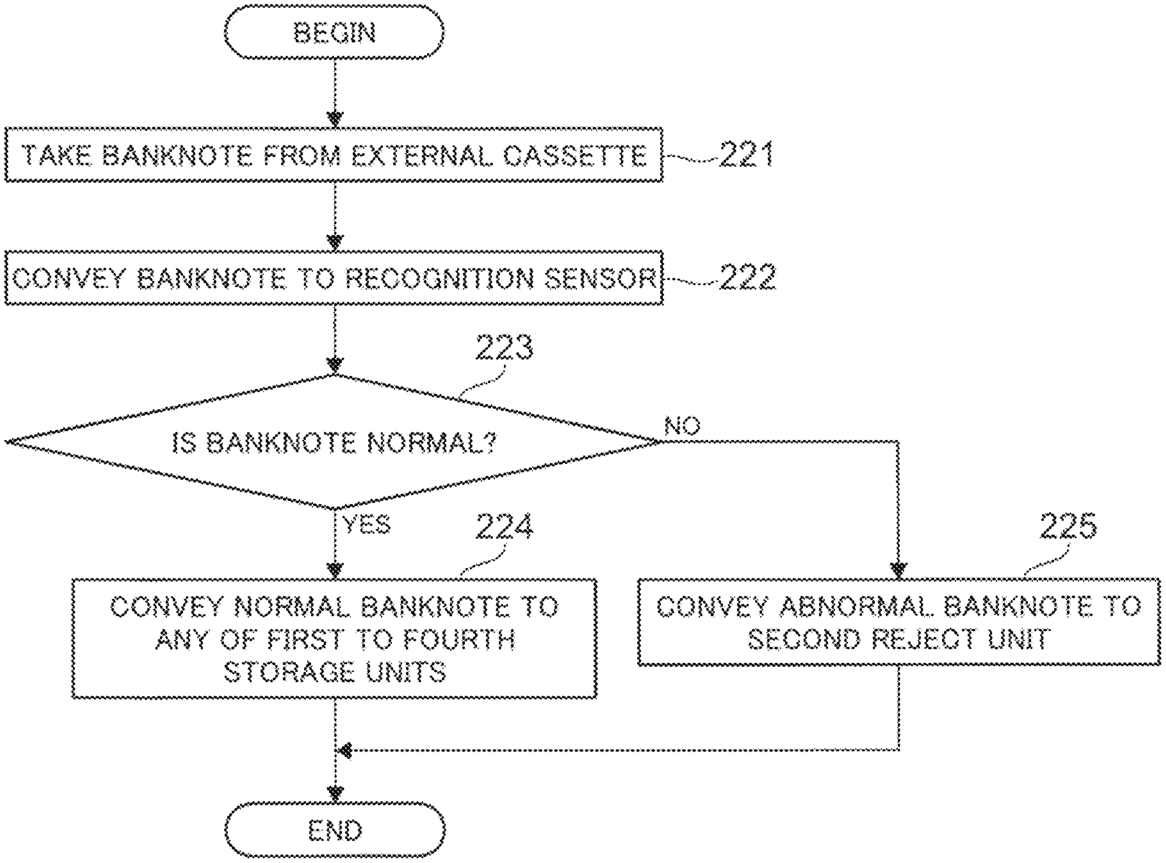
FIG. 3 is a flowchart showing an example of the operation of the banknote processing device performing second conveyance.
Figure 4:
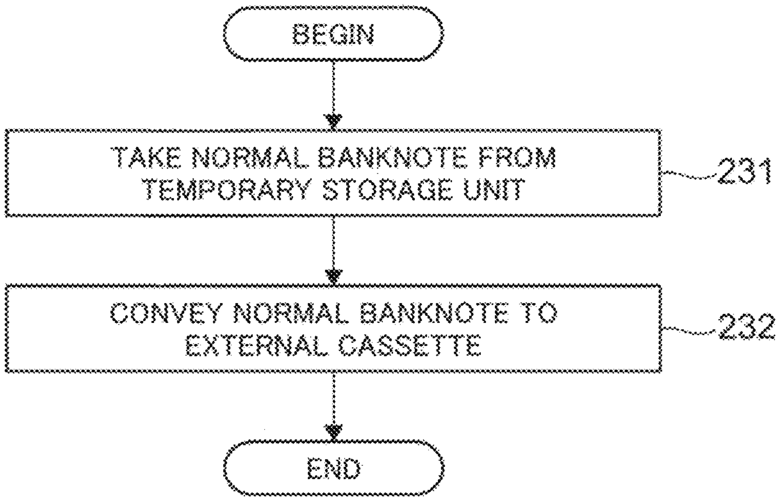
FIG. 4 is a flowchart showing an example of the operation of the banknote processing device performing third conveyance.

FIGS. 2 to 4 are flowcharts showing an example of the operations of the banknote processing device 20 in the first exemplary embodiment. Technically, these example operations are executed by the control unit 290 of the banknote processing device 20, but the following description assumes that the conveyance unit 240 and the recognition sensor 225 of the banknote processing device 20 perform these operations.

FIG. 2 is a flowchart showing an example of the operation of the banknote processing device 20 when it performs the first conveyance. Although this example operation is shown as being executed for a banknote, the banknote processing device 20 may process multiple banknotes by executing this example operation for each of the multiple banknotes.

As shown in FIG. 2, the conveyance unit 240 may take a banknote from any of the first to fourth storage units 231 to 234 (step 211). The conveyance unit 240 may then convey the banknote taken at step 211 to the recognition sensor 225 via the first upper conveyance path 2411 (step 212).

As a result, the recognition sensor 225 may determine whether the banknote conveyed at step 212 is a normal banknote (step 213).

Assume that the recognition sensor 225 determines at step 213 that the banknote is a normal banknote. Then the conveyance unit 240 may convey the normal banknote to the temporary storage unit 224 via the sixth upper conveyance path 2416 (step 214).

On the other hand, assume that the recognition sensor 225 determines at step 213 that the banknote is not a normal banknote, i.e., an abnormal banknote. Then the conveyance unit 240 may convey the abnormal banknote to the first reject unit (step 215).

FIG. 3 is a flowchart showing an example of the operation of the banknote processing device 20 when it performs the second conveyance. Although this example operation is shown as being executed for a banknote, the banknote processing device 20 may process multiple banknotes by executing this example operation for each of the multiple banknotes.

As shown in FIG. 3, the conveyance unit 240 may take a banknote from the external cassette 50 (step 221). The conveyance unit 240 may then convey the banknote taken at step 221 to the recognition sensor 225 via the second upper conveyance path 2412 (step 222).

As a result, the recognition sensor 225 may determine whether the banknote conveyed at step 222 is a normal banknote (step 223).

Assume that the recognition sensor 225 determines at step 223 that the banknote is a normal banknote. Then the conveyance unit 240 may convey the normal banknote to any of the first to fourth storage units 231 to 234 via the ninth upper conveyance path 2419 (step 224).

On the other hand, assume that the recognition sensor 225 determines at step 223 that the banknote is not a normal banknote, i.e., an abnormal banknote. Then the conveyance unit 240 may convey the abnormal banknote to the second reject unit (step 225).

FIG. 4 is a flowchart showing an example of the operation of the banknote processing device 20 when it performs the third conveyance. Although this example operation is shown as being executed for a banknote, the banknote processing device 20 may process multiple banknotes by executing this example operation for each of the multiple banknotes.

As shown in FIG. 4, the conveyance unit 240 may take the normal banknote from the temporary storage unit 224 (step 231). The conveyance unit 240 may then convey the normal banknote taken at step 231 to the external cassette 50 via the fifth upper conveyance path 2415 (step 232).

Second Exemplary Embodiment

Figure 5:
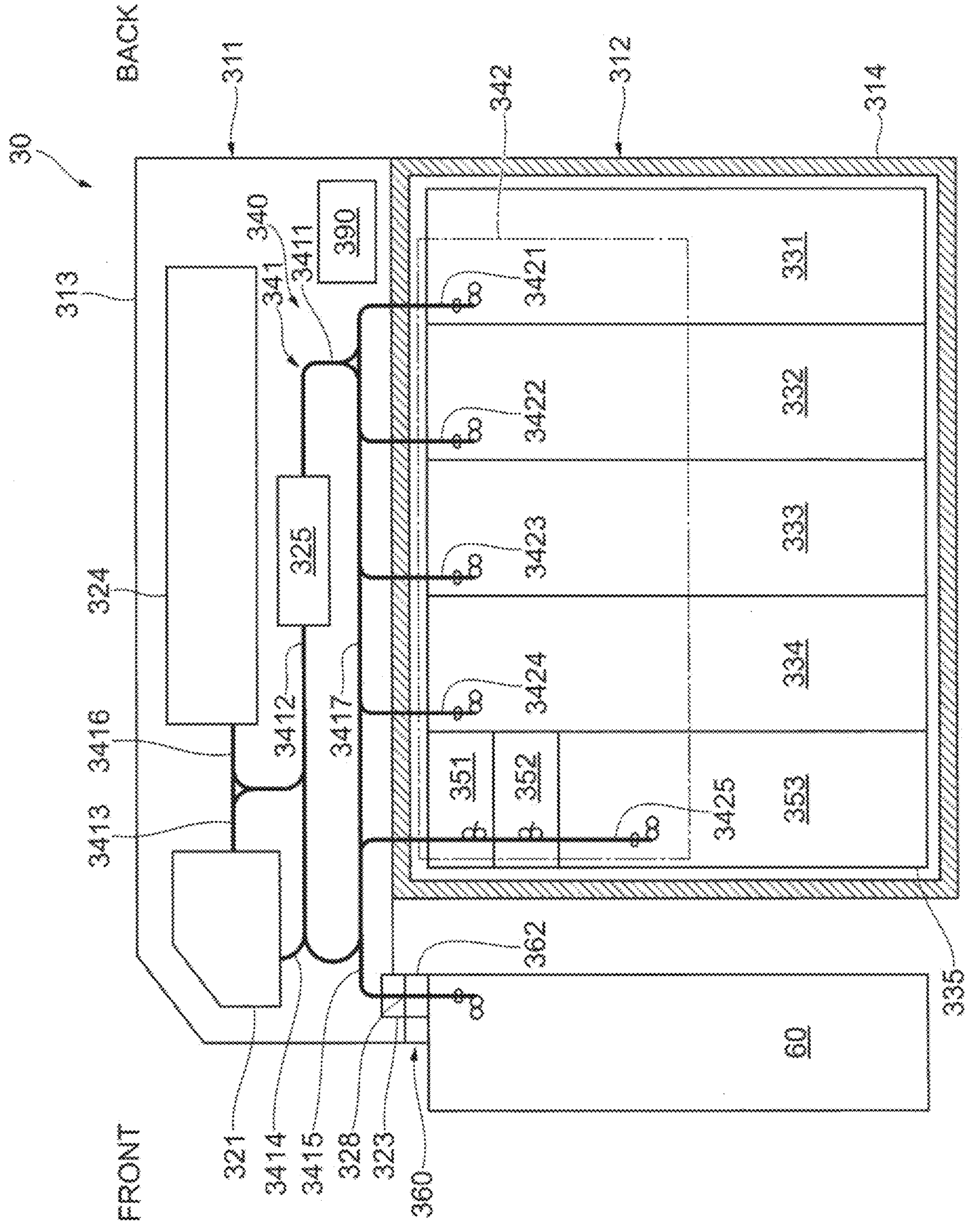
FIG. 5 shows a side view of an example configuration of a banknote processing device in a second exemplary embodiment.

FIG. 5 shows a side view of a banknote processing device 30 in a second exemplary embodiment. The banknote processing device 30 may be configured to be capable of using an external cassette 60. The banknote processing device 30 may include a mounting unit 360. The external cassette 60 may be removably attached to the mounting unit 360. The mounting unit 360 may mechanically be locked to prevent attachment thereto of the external cassette 60 in cases where the external cassette 60 need not be used.

As shown in FIG. 5, the banknote processing device 30 may include a processing part 311 at the top and a safe box part 312 at the bottom.

The processing part 311 may be composed of an upper housing 313. The upper housing 313 may include an inlet/outlet unit 321, a first front conveyance unit 323, a temporary storage unit 324, a recognition sensor 325, and an upper conveyance unit 341. The upper conveyance unit 341 may be part of a conveyance unit 340.

The inlet/outlet unit 321 may be a single unit containing an inlet unit and an outlet unit.

The inlet unit may be used to insert banknotes to be deposited, for example, during a deposit process. An operator can manually insert banknotes into the inlet unit. The inlet unit can hold multiple banknotes in a stacked state. The inlet unit may have a mechanism to take banknotes into the banknote processing device 30 one by one. The inlet unit is an example of the claimed inlet.

The outlet unit may be given banknotes that have been fed out from any of storage units, for example, during a withdrawal process. The outlet unit may also be given banknotes that are not determined to be normal banknotes, for example, during a replenishment or collection process. The outlet unit can hold multiple banknotes in a stacked state. An operator can manually remove banknotes accumulated in the outlet unit. The outlet unit may have a mechanism to take banknotes into the banknote processing device 30 one by one. The outlet unit is an example of the claimed outlet.

The first front conveyance unit 323 may convey banknotes. The first front conveyance unit 323 may be located at the front within the upper housing 313. The first front conveyance unit 323 may be connected to the mounting unit 360. The processing part 311 may have a connecting opening 328. The connecting opening 328 may open downward at the front of the upper housing 313. The first front conveyance unit 323 may have a shutter (not shown). The shutter may open and close the connecting opening 328. When the shutter opens, the mounting unit 360 may engage the first front conveyance unit 323 via the connecting opening 328. The first front conveyance unit 323 and the mounting unit 360 may be connected to each other.

As shown by the thick solid line in FIG. 5, the first front conveyance unit 323 may have a conveyance path. The conveyance path may connect the mounting unit 360 with a fifth upper conveyance path 3415 described below. As described below, banknotes conveyed from the mounting unit 360 may be conveyed along the conveyance path of the first front conveyance unit 323 toward the fifth upper conveyance path 3415. Also, banknotes conveyed from the fifth upper conveyance path 3415 may be conveyed along the conveyance path of the first front conveyance unit 323 toward the mounting unit 360.

The temporary storage unit 324 may temporarily store banknotes to be deposited, for example, during the deposit process. The temporary storage unit 324 may also temporarily store banknotes to be collected, for example, during the collection process. The temporary storage unit 324 may also temporarily store banknotes that are not determined to be normal banknotes, for example during the replenishment process. The temporary storage unit 324 can feed out banknotes that have been stored therein. The temporary storage unit 324 may be located above the recognition sensor 325 in the upper housing 313. The temporary storage unit 324 may be a stack-type storage unit. The temporary storage unit 324 may store banknotes by stacking them. When using a stack-type storage unit, the order of banknotes may change when storing and unloading the banknotes. The temporary storage unit 324 can employ a well-known configuration of a stack-type storage unit. The temporary storage unit 324 is an example of the claimed temporary storage.

The recognition sensor 325 may be provided on the upper conveyance unit 341. The recognition sensor 325 may recognize at least the authenticity, denomination, and soundness of each banknote conveyed along the upper conveyance unit 341. The recognition sensor 325 may also read a symbolic code number printed on each banknote. The recognition sensor 325 is an example of the claimed recognition sensor.

The safe box part 312 may be composed of a safe box housing 314. The safe box housing 314 may include multiple storage units 331 to 335 and a lower conveyance unit 342. The lower conveyance unit 342 may be part of the conveyance unit 340. The safe box housing 314 may protect the multiple storage units 331 to 335 with a predetermined level of security. Specifically, the safe box housing 314 may be formed by a metal plate of a predetermined thickness or greater. The security level of the safe box housing 314 may be higher than that of the upper housing 313. The safe box part 312 is an example of the claimed safe.

The first to fourth storage units 331 to 334 may have the same configuration. The first to fourth storage units 331 to 334 may each be a stack-type storage unit, although detailed illustrations are omitted. The stack-type storage unit stores banknotes by stacking them on top of each other. The first to fourth storage units 331 to 334 may each contain one storage space. The first to fourth storage units 331 to 334 may also each have a conveyance mechanism. The conveyance mechanism may store banknotes from outside to inside the storage unit and may feed out banknotes from inside to outside the storage unit.

The fifth storage unit 335 may include first to third storage spaces 351 to 353. The first storage space 351 may be provided on the top side. The second storage space 352 may be provided below the first storage space 351. The third storage space 353 may be provided below the second storage space 352. The first to third storage spaces 351 to 353 may be independent of each other. The fifth storage unit 335 may have the first conveyance mechanism for the first storage space 351, the second conveyance mechanism for the second storage space 352, and the third conveyance mechanism for the third storage space 353. The fifth storage unit 335 can store banknotes in the first storage space 351 and feed out the banknotes from the first storage space 351. The fifth storage unit 335 can store banknotes in the second storage space 352 and feed out the banknotes from the second storage space 352. The fifth storage unit 335 can store banknotes in the third storage space 353 and feed out the banknotes from the third storage space 353.

The first to fourth storage unit 331 to 334 may each store banknotes of different denominations. The first to fourth storage unit 331 to 334 may each store banknotes for withdrawal. The fifth storage unit 335 may store banknotes that are not to be stored in any of the first to fourth storage units 331 to 334. The fifth storage unit 335 may not store banknotes for withdrawal. The fifth storage unit 335 may store banknotes that are not determined to be normal banknotes, for example, during the replenishment or collection process. An arbitrarily selected storage unit from the first to fifth storage units 331 to 335 may store banknotes that are not determined to be normal banknotes during the replenishment or collection process. However, in the following description, it is assumed that the fifth storage unit 335 stores banknotes that are not determined to be normal banknotes during the replenishment or collection process. Each of the first to fourth storage units 331 to 334 is an example of the claimed internal storage. The fifth storage unit 335 is an example of the claimed specific storage.

The conveyance unit 340 may convey banknotes one by one within the banknote processing device 30, with spaces between each banknote. The conveyance unit 340 may include conveyance paths. The conveyance paths may be composed of a combination of multiple rollers, multiple belts, a motor driving these, and multiple guides, which are not shown. The conveyance unit 340 may convey the banknote, for example, with its long edge leading. The conveyance unit 340 may convey the banknote, for example, with its short edge leading.

The conveyance unit 340 may include the upper conveyance unit 341 and the lower conveyance unit 342. The upper conveyance unit 341 may be provided in the upper housing 313, as described above. The lower conveyance unit 342 may be provided in the safe box housing 314, as described above. Five conveyance paths may be formed in the vertical direction through the upper wall defining the safe box housing 314. The upper conveyance unit 341 and the lower conveyance unit 342 may be connected with each other.

The upper conveyance unit 341 may include first to seventh upper conveyance paths 3411 to 3417. The lower conveyance unit 342 may include first to fifth lower conveyance paths 3421 to 3425. The conveyance unit 340 is an example of the claimed conveyor.

The external cassette 60 may be connected to the banknote processing device 30 via the mounting unit 360, as described above. The mounting unit 360 may include a second front conveyance unit 362, although shown diagrammatically in FIG. 5.

The external cassette 60 may be a stack-type storage cassette, although not shown in detail. The external cassette 60 may have a conveyance mechanism. The conveyance mechanism may introduce banknotes from the outside into the inside of the external cassette 60 and store the banknotes inside the external cassette 60. The conveyance mechanism may also eject banknotes stored in the external cassette 60 from the inside to the outside of the external cassette 60.

The external cassette 60 may have substantially the same structure as the first to fourth storage units 331 to 334. The external cassette 60 may also have the same external dimensions as the first to fifth storage units 331 to 335. The external cassette 60 may be removably attached to the safe box housing 314 in the same position in which the first to fifth storage units 331 to 335 are placed. The external cassette 60 may be repurposed as the first to fourth storage units 331 to 334. The external cassette 60 is an example of the claimed external storage.

The second front conveyance unit 362 may be connected to the connecting opening 328 of the first front conveyance unit 323. The second front conveyance unit 362 may have a conveyance path, as shown by the thick solid line in FIG. 5. This conveyance path may connect the conveyance path of the first front conveyance unit 323 with the external cassette 60. The second front conveyance unit 362 may convey banknotes fed out from the external cassette 60 to the first front conveyance unit 323. The second front conveyance unit 362 may also convey banknotes sent from the first front conveyance unit 323 to the external cassette 60.

As also shown in FIG. 5, the banknote processing device 30 may include a control unit 390. The control unit 390 may be a CPU, and may be connected to a RAM, a ROM, an HDD, and the like, which are not shown. The control unit 390 may control the entire banknote processing device 30, for example, by reading a program stored in the ROM into the RAM and executing it.

First, the control unit 390 may control the conveyance unit 340 to perform first conveyance. Here, the first conveyance may be the first half of the collection process. Specifically, the first conveyance may be the process of conveying banknotes from any of the first to fourth storage units 331 to 334 to the temporary storage unit 324.

At that time, the control unit 390 may control the recognition sensor 325 to recognize each of the banknotes conveyed by the conveyance unit 340. Alternatively, the control unit 390 may control the recognition sensor 325 not to recognize each of the banknotes conveyed by the conveyance unit 340. Whether the control unit 390 controls the recognition sensor 325 to recognize or not to recognize each of the banknotes may be determined by a setting of the recognition sensor 325. If the recognition sensor 325 recognizes normal media, the control unit 390 may control the conveyance unit 340 to convey the normal media to the temporary storage unit 324. If the recognition sensor 325 recognizes abnormal media, the control unit 390 may control the conveyance unit 340 to convey the abnormal media to a first reject unit. The first reject unit is an example of the claimed first evacuation storage.

Next, the control unit 390 may control the conveyance unit 340 to perform second conveyance. Here, the second conveyance may be a replenishment process. Specifically, the second conveyance may be the process of conveying banknotes from the external cassette 60 to any of the first to fourth storage units 331 to 334.

At that time, the control unit 390 may control the recognition sensor 325 to recognize each of the banknotes conveyed by the conveyance unit 340. If the recognition sensor 325 recognizes normal media, the control unit 390 may control the conveyance unit 340 to convey the normal media to any of the first to fourth storage units 331 to 334. If the recognition sensor 325 recognizes abnormal media, the control unit 390 may control the conveyance unit 340 to convey the abnormal media to a second reject unit. The second reject unit is an example of the claimed second evacuation storage.

Next, the control unit 390 may control the conveyance unit 340 to perform third conveyance. Here, the third conveyance may be the latter half of the collection process. Specifically, the third conveyance may be the process of conveying the normal banknotes from the temporary storage unit 324 to the external cassette 60.

The control unit 390 may also control the external cassette 60 to remain fixed to the banknote processing device 30 during the first conveyance to the third conveyance.

In addition, the control unit 390 may control information about the first conveyance, the second conveyance, and the third conveyance to be stored in a memory of the external cassette 60. The information about the first conveyance, the second conveyance, and the third conveyance may be information about the collection process and the replenishment process. The information about the collection process and the replenishment process may include the type of process, date and time, the serial number of the banknote processing device 30, the denomination, the symbolic code number, the reasons why abnormal banknotes were determined to be abnormal, and the like. Alternatively, the information about the collection process and the replenishment process may further include an image of a banknote. The control unit 390 is an example of the claimed control circuitry.

An example of the operations of the banknote processing device 30 in the second exemplary embodiment is similar to the example of the operations of the banknote processing device 20 in the first exemplary embodiment shown in FIGS. 2 to 4.

Third Exemplary Embodiment

A third exemplary embodiment contemplates variations of the first reject unit and the second reject unit in the banknote processing device 20 in the first exemplary embodiment or the banknote processing device 30 in the second exemplary embodiment.

First, multiple implementations of the first reject unit will be described.

A first implementation may be an implementation where the outlet unit 222 is used as the first reject unit in the first exemplary embodiment. The outlet unit 222 may have a shutter and may be used as a box with the shutter closed. In this implementation, a banker may later retrieve banknotes from the outlet unit 222, check them, and deposit the banknotes available for deposit from the inlet unit 221 into the first to fourth storage units 231 to 234. In this way, the banknotes may be conveyed to the first to fourth storage units 231 to 234 before the second conveyance.

The first implementation may be an implementation where the outlet unit of the inlet/outlet unit 321 is used as the first reject unit in the second exemplary embodiment.

A second implementation may be an implementation where the fifth storage unit 235 is used as the first reject unit in the first exemplary embodiment. Here, the fifth storage unit 235 may be a storage unit that stores rejected banknotes in the withdrawal or collection process. Also in this implementation, a banker may later retrieve banknotes from the fifth storage unit 235, check them, and deposit the banknotes available for deposit into the first to fourth storage units 231 to 234.

The second implementation may be an implementation where the fifth storage unit 335 is used as the first reject unit in the second exemplary embodiment. Here, the fifth storage unit 335 may be a storage unit that stores rejected banknotes in the withdrawal or collection process.

A third implementation may be an implementation where the temporary storage unit 224 is used as the first reject unit in the first exemplary embodiment. In this implementation, the rejected banknotes in the collection process will be mixed with the banknotes to be collected. Therefore, this implementation is not desirable.

The third implementation may be an implementation where the temporary storage unit 324 is used as the first reject unit in the second exemplary embodiment.

Next, multiple implementations of the second reject unit will be described.

A first implementation may be an implementation where the outlet unit 222 is used as the second reject unit in the first exemplary embodiment. The outlet unit 222 may have a shutter and may be used as a box with the shutter closed.

Here, assume an implementation where the fifth storage unit 235 is used as the first reject unit.

In this implementation, consider a case where the denomination and number of banknotes stored in the external cassette 50 are not known. In this case, suppose that all the banknotes stored in the external cassette 50 are to be loaded into the first to fourth storage units 231 to 234. Then, a banker may later retrieve banknotes from the outlet unit 222, check them, and deposit the banknotes available for deposit from the inlet unit 221 into the first to fourth storage units 231 to 234, while keeping at hand the banknotes unavailable for deposit. Alternatively, suppose that the banknotes that cannot be loaded into the first to fourth storage units 231 to 234 are to be returned to the external cassette 50. Then, the banknote processing device 20 may take the rejected banknotes from the outlet unit 222 and convey them to the external cassette 50. In this case, the outlet unit 222 may have a function taking in the banknotes therefrom.

On the other hand, consider a case where the denomination and number of banknotes stored in the external cassette 50 are known. This case is the same as the case described above where the denomination and number of banknotes stored in the external cassette 50 are not known. At that time, the denomination and number of rejected banknotes can be calculated using the denomination and number of normal banknotes stored in the first to fourth storage units 231 to 234.

Also, assume an implementation where the outlet unit 222 is used as the first reject unit.

In this implementation, consider a case where the denomination and number of banknotes stored in the external cassette 50 are not known. In this case, suppose that all the banknotes stored in the external cassette 50 are to be loaded into the first to fourth storage units 231 to 234. Alternatively, suppose that the banknotes that cannot be loaded into the first to fourth storage units 231 to 234 are to be returned to the external cassette 50. In either case, the rejected banknotes in the replenishment process will be mixed with the rejected banknotes in the collection process. Therefore, this implementation is not desirable.

On the other hand, consider a case where the denomination and number of banknotes stored in the external cassette 50 are known. In this case, suppose that all the banknotes stored in the external cassette 50 are to be loaded into the first to fourth storage units 231 to 234. Then, a banker may later retrieve banknotes from the outlet unit 222, check them, and deposit the banknotes available for deposit from the inlet unit 221 into the first to fourth storage units 231 to 234, while keeping at hand the banknotes unavailable for deposit. At that time, the denomination and number of rejected banknotes can be calculated using the denomination and number of normal banknotes stored in the first to fourth storage units 231 to 234. Alternatively, suppose that the banknotes that cannot be loaded into the first to fourth storage units 231 to 234 are to be returned to the external cassette 50. Then, the rejected banknotes in the replenishment process will be mixed with the rejected banknotes in the collection process. Therefore, this implementation is not desirable. At that time, the denomination and number of rejected banknotes can be calculated using the denomination and number of normal banknotes stored in the first to fourth storage units 231 to 234.

The first implementation may be an implementation where the outlet unit of the inlet/outlet unit 321 is used as the second reject unit in the second exemplary embodiment. In this implementation, the fifth storage unit 335 may be used as the first reject unit. Also, the outlet unit of the inlet/outlet unit 321 may be used as the first reject unit.

The second implementation may be an implementation where the fifth storage unit 235 is used as the second reject unit in the first exemplary embodiment.

Here, assume an implementation where the fifth storage unit 235 is a storage unit that stores rejected banknotes in the withdrawal or collection process.

In this implementation, consider a case where the denomination and number of banknotes stored in the external cassette 50 are not known. In this case, suppose that all the banknotes stored in the external cassette 50 are to be loaded into the first to fourth storage units 231 to 234. Alternatively, suppose that the banknotes that cannot be loaded into the first to fourth storage units 231 to 234 are to be returned to the external cassette 50. In either case, the rejected banknotes in the replenishment process will be mixed with the rejected banknotes in the withdrawal or collection process. Therefore, this implementation is not desirable. However, the symbolic code number may be used to prevent banknotes already stored in the fifth storage unit 235 from being returned to the external cassette 50.

On the other hand, consider a case where the denomination and number of banknotes stored in the external cassette 50 are known. In this case, suppose that all the banknotes stored in the external cassette 50 are to be loaded into the first to fourth storage units 231 to 234. Then, a banker may later retrieve banknotes from the fifth storage unit 235, check them, and deposit the banknotes available for deposit into the first to fourth storage units 231 to 234, while keeping at hand the banknotes unavailable for deposit. At that time, the denomination and number of rejected banknotes can be calculated using the denomination and number of normal banknotes stored in the first to fourth storage units 231 to 234. Alternatively, suppose that the banknotes that cannot be loaded into the first to fourth storage units 231 to 234 are to be returned to the external cassette 50. Then, the rejected banknotes in the replenishment process will be mixed with the rejected banknotes in the withdrawal or collection process. Therefore, this implementation is not desirable. However, the symbolic code number may be used to prevent banknotes already stored in the fifth storage unit 235 from being returned to the external cassette 50. At that time, the denomination and number of rejected banknotes can be calculated using the denomination and number of normal banknotes stored in the first to fourth storage units 231 to 234.

Also, assume an implementation where the fifth storage unit 235 is a stack-type storage unit that stores rejected banknotes in the replenishment process.

In this implementation, consider a case where the denomination and number of banknotes stored in the external cassette 50 are not known. In this case, suppose that all the banknotes stored in the external cassette 50 are to be loaded into the first to fourth storage units 231 to 234. Then, a banker may later retrieve banknotes from the fifth storage unit 235, check them, and deposit the banknotes available for deposit into the first to fourth storage units 231 to 234, while keeping at hand the banknotes unavailable for deposit. Alternatively, suppose that the banknotes that cannot be loaded into the first to fourth storage units 231 to 234 are to be returned to the external cassette 50. However, a banker cannot return the banknotes that cannot be loaded into the first to fourth storage units 231 to 234 to the external cassette 50, because he/she needs to access the fifth storage unit 23 from the outside. Therefore, this implementation is not desirable.

On the other hand, consider a case where the denomination and number of banknotes stored in the external cassette 50 are known. This case is the same as the case described above where the denomination and number of banknotes stored in the external cassette 50 are not known. At that time, the denomination and number of rejected banknotes can be calculated using the denomination and number of normal banknotes stored in the first to fourth storage units 231 to 234.

Furthermore, assume an implementation where the fifth storage unit 235 is a tape-type storage unit that stores rejected banknotes in the replenishment process. In this case, the fifth storage unit 235 is an example of the claimed specific storage configured so that media are fed therefrom with an order of the media maintained.

In this implementation, consider a case where the denomination and number of banknotes stored in the external cassette 50 are not known. In this case, suppose that all the banknotes stored in the external cassette 50 are to be loaded into the first to fourth storage units 231 to 234. Then, a banker may later check the banknotes returned from the fifth storage unit 235 and deposit the banknotes available for deposit into the first to fourth storage units 231 to 234. In this way, banknotes may be conveyed to the first to fourth storage units 231 to 234 before or after the third conveyance. In addition, a banker may keep at hand the banknotes unavailable for deposit. Alternatively, suppose that the banknotes that cannot be loaded into the first to fourth storage units 231 to 234 are to be returned to the external cassette 50. Then, the banknote processing device 20 may convey the rejected banknotes in the replenishment process to the external cassette 50 after the completion of the replenishment process for the normal banknotes. If multiple external cassettes 50 are used, the banknote processing device 20 may convey together the rejected banknotes in the replenishment process to the external cassette 50 after the completion of the replenishment process from the multiple external cassettes 50.

On the other hand, consider a case where the denomination and number of banknotes stored in the external cassette 50 are known. This case is the same as the case described above where the denomination and number of banknotes stored in the external cassette 50 are not known. At that time, the denomination and number of rejected banknotes can be calculated using the denomination and number of normal banknotes stored in the first to fourth storage units 231 to 234.

Furthermore, assume an implementation where the fifth storage unit 235 is a deposit-only storage unit.

In this implementation, consider a case where the denomination and number of banknotes stored in the external cassette 50 are not known. In this case, suppose that all the banknotes stored in the external cassette 50 are to be loaded into the first to fourth storage units 231 to 234. Then, if banknotes have already been stored in the fifth storage unit 235, the number of banknotes conveyed to the fifth storage unit 235 will be unknown. Therefore, this implementation is not desirable.

On the other hand, consider a case where the denomination and number of banknotes stored in the external cassette 50 are known. In this case, suppose that all the banknotes stored in the external cassette 50 are to be loaded into the first to fourth storage units 231 to 234. Then, the banknotes stored in the fifth storage unit 235 can be left untouched. At that time, the denomination and number of rejected banknotes can be calculated using the denomination and number of normal banknotes stored in the first to fourth storage units 231 to 234. Alternatively, suppose that the banknotes that cannot be loaded into the first to fourth storage units 231 to 234 are to be returned to the external cassette 50. However, since the fifth storage unit 235 is the deposit-only storage unit, the banknotes stored in the fifth storage unit 235 are not fed out. Therefore, this implementation is not desirable.

The second implementation may be an implementation where the fifth storage unit 335 is used as the second reject unit in the second exemplary embodiment.

A third implementation may be an implementation where the temporary storage unit 224 is used as the second reject unit in the first exemplary embodiment. The temporary storage unit 224 may be a tape-type storage unit. In this case, the temporary storage unit 224 is an example of the claimed temporary storage configured so that media are fed therefrom with an order of the media maintained.

In this implementation, consider a case where the denomination and number of banknotes stored in the external cassette 50 are not known. In this case, suppose that all the banknotes stored in the external cassette 50 are to be loaded into the first to fourth storage units 231 to 234. Then, the rejected banknotes in the replenishment process will be mixed with the banknotes to be collected. Therefore, this implementation is not desirable. Alternatively, suppose that the banknotes that cannot be loaded into the first to fourth storage units 231 to 234 are to be returned to the external cassette 50. Then, the banknote processing device 20 may convey the rejected banknotes in the replenishment process to the external cassette 50 after the completion of the replenishment process for the normal banknotes. If multiple external cassettes 50 are used, the banknote processing device 20 may convey together the rejected banknotes in the replenishment process to the external cassette 50 after the completion of the replenishment process from the multiple external cassettes 50. That is, the rejected banknotes in the replenishment process may be conveyed to the external cassette 50 together with the banknotes to be collected whose number has already been determined. Specifically, the rejected banknotes in the replenishment process may be conveyed to the external cassette 50 before the third conveyance.

On the other hand, consider a case where the denomination and number of banknotes stored in the external cassette 50 are known. This case is the same as the case described above where the denomination and number of banknotes stored in the external cassette 50 are not known. At that time, the denomination and number of rejected banknotes can be calculated using the denomination and number of normal banknotes stored in the first to fourth storage units 231 to 234.

Meanwhile, if the rejected banknotes in the replenishment process and the banknotes to be collected are to be conveyed to the external cassette 50 as described above, it is necessary to separate these two groups of banknotes.

A first method of separating the two groups of banknotes may be a method to use symbolic code numbers.

A second method of separating the two groups of banknotes may be a method to adjust pitches each between two adjacent banknotes in the temporary storage unit 224.

Figure 6:
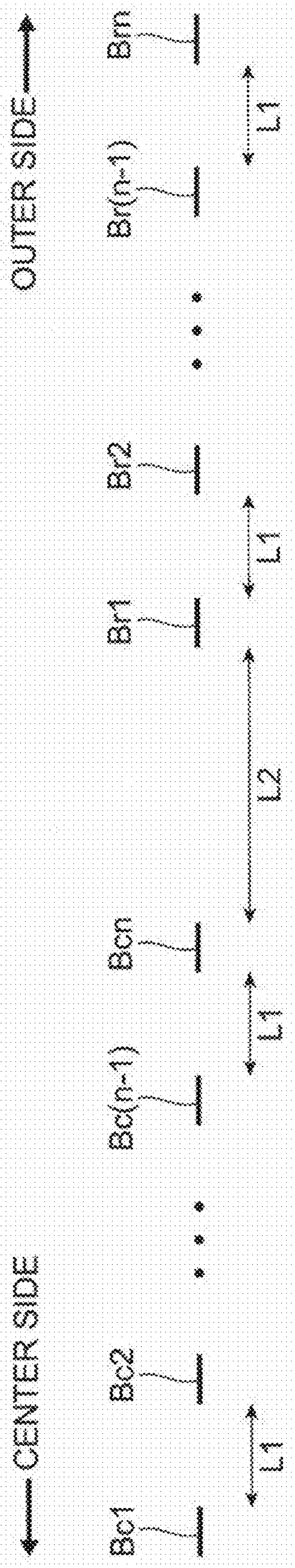
FIG. 6 illustrates a second method of separating two groups of banknotes.

FIG. 6 illustrates this second method. FIG. 6 shows an example of an expanded row of the banknotes in the temporary storage unit 224. As shown in FIG. 6, the temporary storage unit 224 may store the banknotes to be collected Bc1, Bc2, . . . , Bc(n−1), Bcn, on the center side and the rejected banknotes in the replenishment process Br1, Br2, . . . , Br(n−1), Brn on the outer side. In principle, each pitch between two adjacent banknotes may be L1, and exceptionally, only one pitch between two adjacent banknotes may be L2. The only one pitch may be a pitch in the boundary region between the banknotes to be collected and the rejected banknotes in the replenishment process. Here, the pitch L2 may be longer than the pitch L1. Alternatively, although not shown in the figure, each pitch between two adjacent banknotes in the banknotes to be collected may be L11, and each pitch between two adjacent banknotes in the rejected banknotes in the replenishment process may be L12. Here, the pitch L11 and the pitch L12 may have different lengths, and the pitch L2 may be longer than any of the pitches L11 and L12. In this case, the banknotes to be collected are an example of the claimed first media, and the rejected banknotes in the replenishment process are an example of the claimed second media. The pitch L11 is an example of the claimed pitch between two adjacent media of the first media, and the pitch L12 is an example of the claimed pitch between two adjacent media of the second media. The pitch L2 is an example of the claimed pitch between the first media and the second media.

A fourth implementation may be an implementation where the temporary storage unit 324 is used as the second reject unit in the second exemplary embodiment. The temporary storage unit 324 may be a stack-type storage unit.

In this implementation, consider a case where the denomination and number of banknotes stored in the external cassette 60 are not known. In this case, suppose that all the banknotes stored in the external cassette 60 are to be loaded into the first to fourth storage units 331 to 334. Then, the rejected banknotes in the replenishment process will be mixed with the banknotes to be collected. Therefore, this implementation is not desirable. Alternatively, suppose that the banknotes that cannot be loaded into the first to fourth storage units 331 to 334 are to be returned to the external cassette 60. Then, the banknote processing device 30 cannot feed out the banknotes to be collected from the temporary storage unit 324 as it stores the rejected banknotes in the replenishment process in the temporary storage unit 324. Therefore, this implementation is also not desirable.

On the other hand, consider a case where the denomination and number of banknotes stored in the external cassette 60 are known. This case is the same as the case described above where the denomination and number of banknotes stored in the external cassette 60 are not known. At that time, the denomination and number of rejected banknotes can be calculated using the denomination and number of normal banknotes stored in the first to fourth storage units 331 to 334.

A fifth implementation may be an implementation where the external cassette 50 is used as the second reject unit in the first exemplary embodiment. This implementation may be an implementation in a case where the banknotes that cannot be loaded into the first to fourth storage units 231 to 234 are to be returned to the external cassette 50.

In this implementation, when a rejected banknote in the replenishment process is detected, the feeding out from the external cassette 50 may be stopped. Then, following the taking out of the last banknote fed out from the external cassette 50 after this stop, the conveying direction of the conveyance path of the external cassette 50 may be reversed. Thereby, the rejected banknote in the replenishment process can be collected in a box in the external cassette 50.

Figure 7C:
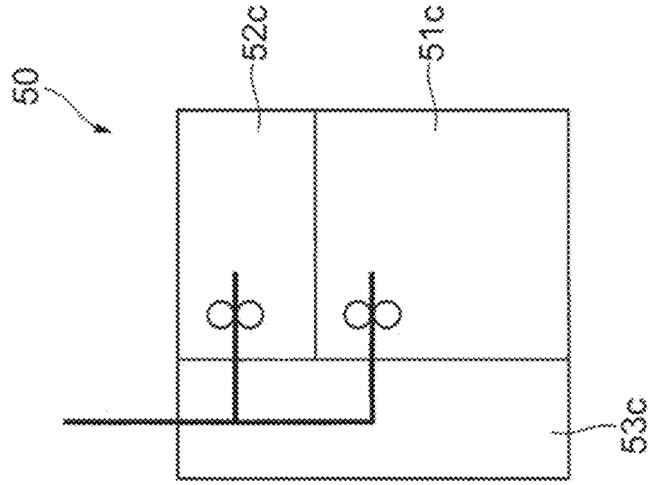
FIGS. 7A to 7C show three examples of the configuration of the external cassette used for a fifth implementation of a second reject unit.
Figure 7B:
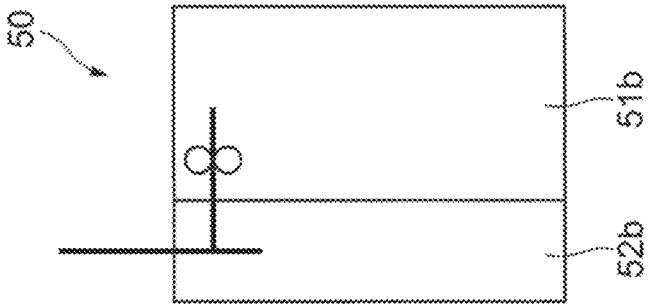
Figure 7A:
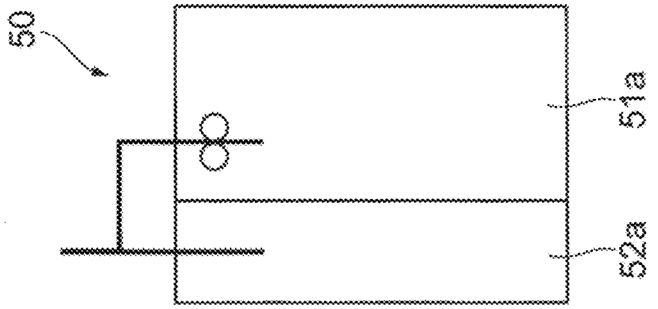

FIGS. 7A to 7C show three examples of the configuration of the external cassette 50 used in this implementation.

As shown in FIG. 7A, the external cassette 50 may include storage spaces 51*a* and 52*a*. The storage space 51*a* may be a deposit and withdrawal vault capable of storing and unloading banknotes, and the storage space 52*a* may be a simple box capable of only storing banknotes. If the external cassette 50 of FIG. 7A is used, the banknotes for replenishment are fed out from the storage space 51*a*, and the rejected banknotes may be stored in the storage space 52*a*.

As shown in FIG. 7B, the external cassette 50 may include storage spaces 51*b* and 52*b*. The storage space 51*b* may be a deposit and withdrawal vault capable of storing and unloading banknotes, and the storage space 52*b* may be a simple box capable of only storing banknotes. If the external cassette 50 of FIG. 7B is used, the banknotes for replenishment are fed out from the storage space 51*b*, and the rejected banknotes may be stored in the storage space 52*b*.

As shown in FIG. 7C, the external cassette 50 may include storage spaces 51*c* and 52*c*, and a conveyance box 53*c*. The storage spaces 51*c* and 52*c* may each be a deposit and withdrawal vault capable of storing and unloading banknotes. If the external cassette 50 of FIG. 7C is used, the banknotes for replenishment may be fed out from the storage space 51*c*, and the rejected banknotes may be stored in the storage space 52*c*, for example.

In this way, the external cassette 50 has one conveyance port at the storage space 51*a* and the other conveyance port at the storage space 52*a* in FIG. 7A. Thus, in FIG. 7A, unloading from the external cassette 50 and storing in the external cassette 50 can be performed simultaneously. On the other hand, the external cassette 50 has only one conveyance port at the storage space 52*b* in FIG. 7B, and only one conveyance port at the conveyance box 53*c* shared by the storage spaces 51*c* and 52*c* in FIG. 7C. Thus, in FIGS. 7B and 7C, unloading from the external cassette 50 and storing in the external cassette 50 cannot be performed simultaneously.

The fifth implementation may be an implementation where the external cassette 60 is used as the second reject unit in the second exemplary embodiment. This implementation may be an implementation in a case where the banknotes that cannot be loaded into the first to fourth storage units 331 to 334 are to be returned to the external cassette 60.

In this implementation, when a rejected banknote in the replenishment process is detected, the feeding out from the external cassette 60 may be stopped. Then, following the taking out of the last banknote fed out from the external cassette 60 after this stop, the conveying direction of the conveyance path of the external cassette 60 may be reversed. Thereby, the rejected banknote in the replenishment process can be collected in a box in the external cassette 60.

Now suppose that the feeding out from the external cassette 60 is stopped immediately after the rejected banknote in the replenishment process is detected. However, even so, there is a case where switching of a branch at a branch point between the second upper conveyance paths 3412 and the fifth upper conveyance paths 3415 is not completed in time, in the second exemplary embodiment.

Figure 8:
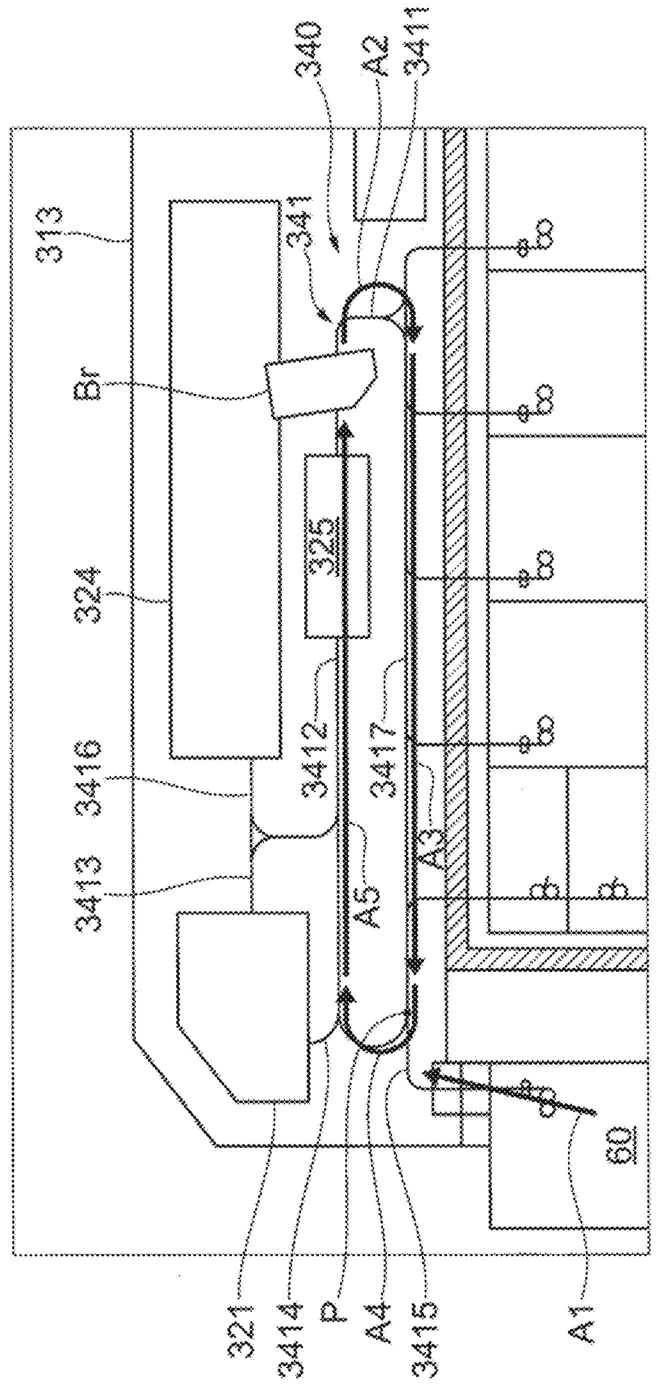
FIG. 8 illustrates a case where switching of a branch at a branch point is not completed in time.

FIG. 8 illustrates this case. That is, after the banknotes fed out from the external cassette 60 reach the branch point P as indicated by the arrow A1, the motor driving the fifth upper conveyance path 3415 cannot be reversed before the rejected banknote Br reaches the branch point P. In this case, the rejected banknote Br may be made to wait for the motor to be reversed. For example, the rejected banknote Br may be conveyed another round along the first upper conveyance path 3411, the seventh upper conveyance path 3417, and the second upper conveyance path 3412, as indicated by the arrows A2 to A5. Alternatively, the first upper conveyance path 3411, the seventh upper conveyance path 3417, and the second upper conveyance path 3412 may be temporarily stopped.

Note that the multiple implementations of the first reject unit and the multiple implementations of the second reject unit may be implemented independently of each other. For example, the first reject unit may take the form of the first implementation, and the second reject unit may take the form of the first implementation. Alternatively, the first reject unit may take the form of the second implementation, and the second reject unit may take the form of the third implementation.

What is claimed is:

1. A device for processing media, comprising:

a safe;

an internal storage installed within the safe;

a conveyor configured to convey media between the internal storage and an external storage, the external storage being configured to be fixed to the device outside the safe;

a temporary storage coupled to the conveyor; and a recognition sensor configured to recognize media conveyed by the conveyor, wherein the conveyor is configured to:

perform first conveyance to convey media from the internal storage to the temporary storage;

perform second conveyance to convey media from the external storage to the internal storage, after the first conveyance; and perform third conveyance to convey media from the temporary storage to the external storage, after the second conveyance, and the external storage is configured to be maintained in a fixed state to the device during the first conveyance to the third conveyance, wherein the device further comprises control circuitry configured to store information regarding the first conveyance, the second conveyance, and the third conveyance in a memory of the external storage.

2. The device of claim 1, wherein, in the first conveyance, the recognition sensor is configured to recognize or not recognize media conveyed by the conveyor depending on a setting of the recognition sensor.

3. The device of claim 1, wherein, in the first conveyance, the conveyor is configured to convey normal media to the temporary storage in response to the normal media being recognized by the recognition sensor, and convey abnormal media to a first evacuation storage in response to the abnormal media being recognized by the recognition sensor.

4. The device of claim 3, wherein the first evacuation storage is a specific storage installed within the safe and different from the internal storage.

5. The device of claim 3, further comprising an outlet for media, wherein the first evacuation storage is the outlet for media.

6. The device of claim 5, wherein the conveyor is configured to convey the abnormal media from the outlet to the internal storage before the second conveyance.

7. The device of claim 5, further comprising an inlet for media, wherein the inlet and the outlet are configured as a single unit.

8. The device of claim 1, wherein, in the second conveyance, the recognition sensor is configured to recognize media conveyed by the conveyor.

9. The device of claim 8, wherein, in the second conveyance, the conveyor is configured to convey normal media to the internal storage in response to the normal media being recognized by the recognition sensor, and convey abnormal media to a second evacuation storage in response to the abnormal media being recognized by the recognition sensor.

10. The device of claim 9, wherein the second evacuation storage is a specific storage installed within the safe and different from the internal storage.

11. The device of claim 10, wherein the specific storage is configured so that media are fed therefrom with an order of the media maintained, and the conveyor is configured to convey the abnormal media from the specific storage to the external storage before or after the third conveyance.

12. The device of claim 9, further comprising an outlet for media, wherein the second evacuation storage is the outlet for media.

13. The device of claim 12, wherein the conveyor is configured to convey the abnormal media from the outlet to the external storage before or after the third conveyance.

14. The device of claim 9, wherein the second evacuation storage is the temporary storage, the temporary storage is configured so that media are fed therefrom with an order of the media maintained, and the conveyor is configured to convey the abnormal media from the temporary storage to the external storage before the third conveyance.

15. The device of claim 14, wherein the temporary storage is configured to store first media and second media, the first media being media conveyed in the first conveyance, the second media being the abnormal media recognized by the recognition sensor in the second conveyance, and a pitch between the first media and the second media is greater than both of a pitch between two adjacent media of the first media and a pitch between two adjacent media of the second media.

16. The device of claim 1, wherein in the first conveyance, the conveyor is configured to convey normal media to the temporary storage in response to the normal media being recognized by the recognition sensor, and convey abnormal media to a first evacuation storage in response to the abnormal media being recognized by the recognition sensor, in the second conveyance, the conveyor is configured to convey normal media to the internal storage in response to the normal media being recognized by the recognition sensor, and convey abnormal media to a second evacuation storage in response to the abnormal media being recognized by the recognition sensor, and the second evacuation storage is different from the first evacuation storage.

17. The device of claim 1, wherein the internal storage and the external storage are cassettes in which media are stacked.

18. The device of claim 1, wherein the temporary storage is disposed in front of or above the recognition sensor.

19. A method in a device for processing media, the device comprising:

a safe;

an internal storage installed within the safe;

a conveyor configured to convey media between the internal storage and an external storage, the external storage being configured to be fixed to the device outside the safe;

a temporary storage coupled to the conveyor; and a recognition sensor configured to recognize media conveyed by the conveyor, wherein the method comprises:

performing, by the conveyor, first conveyance to convey media from the internal storage to the temporary storage;

performing, by the conveyor, second conveyance to convey media from the external storage to the internal storage, after the first conveyance;

performing, by the conveyor, third conveyance to convey media from the temporary storage to the external storage, after the second conveyance; and maintaining the external storage in a fixed state to the device during the first conveyance to the third conveyance.

* * * * *